(12) United States Patent
Gebhart et al.

(10) Patent No.: US 7,779,410 B2
(45) Date of Patent: Aug. 17, 2010

(54) CONTROL INTERFACES FOR DISTRIBUTED SYSTEM APPLICATIONS

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 1437 days.

(21) Appl. No.: 11/016,439

(22) Filed: Dec. 17, 2004

(65) Prior Publication Data

US 2006/0136908 A1 Jun. 22, 2006

(51) Int. Cl.
G06F 9/46 (2006.01)
G06F 9/445 (2006.01)

(52) U.S. Cl. .................. 718/100; 718/102; 718/104; 718/105; 717/177

(58) Field of Classification Search .......... 700/29, 700/30; 707/1, 6, 10, 3, 100, 200; 709/219, 709/203, 231; 717/107, 174, 177, 106, 104; 718/102, 100, 104, 105

See application file for complete search history.

(56) References Cited

U.S. PATENT DOCUMENTS

| | | | |
|---|---|---|---|
| 4,974,149 A * | 11/1990 | Valenti | 709/217 |
| 5,678,044 A * | 10/1997 | Pastilha et al. | 707/104.1 |
| 6,901,590 B2 | 5/2005 | Narayanaswamy et al. | 717/177 |
| 7,028,079 B2 * | 4/2006 | Mastrianni et al. | 709/217 |
| 7,103,628 B2 * | 9/2006 | Neiman et al. | 709/201 |
| 7,203,944 B1 * | 4/2007 | van Rietschote et al. | 718/104 |
| 7,272,824 B2 * | 9/2007 | Black-Ziegelbein et al. | 717/126 |
| 2001/0042094 A1 * | 11/2001 | Mitchell et al. | 709/203 |
| 2002/0002578 A1 | 1/2002 | Yamashita | |
| 2003/0192031 A1 * | 10/2003 | Srinivasan et al. | 717/120 |
| 2003/0220967 A1 * | 11/2003 | Potter et al. | 709/203 |
| 2004/0098447 A1 * | 5/2004 | Verbeke et al. | 709/201 |
| 2005/0182846 A1 * | 8/2005 | Schofield et al. | 709/232 |
| 2005/0196030 A1 * | 9/2005 | Schofield et al. | 382/132 |
| 2006/0117378 A1 * | 6/2006 | Tam et al. | 726/3 |

FOREIGN PATENT DOCUMENTS

WO WO 01/86440 A2 11/2001

OTHER PUBLICATIONS

Laszewski Von Gregor et al: "Grid-based asynchronous migration of execution context in Java virtual machines" Lecture Notes in Computer Science, Springer Verlag, New York, NY US. vol. 1900, Sep. 2000, XP002309353 ISSN: 0302-9743.*

(Continued)

*Primary Examiner*—Meng-Ai An
*Assistant Examiner*—Tammy Lee
(74) *Attorney, Agent, or Firm*—Finnegan, Henderson, Farabow, Garrett & Dunner, L.L.P.

(57) ABSTRACT

Methods and apparatus, including computer program products, for control interfaces for distributed system applications. A method includes, at an application deployed on a first computing system in a grid computing environment, monitoring a communication channel connecting the first computing system to a second computing system, receiving a command over the communication channel from the second computing system, and in response to the received command, generating a descriptor file including descriptions of one or more actions to be performed by the second computing system in order to move the application from the first computing system to a third computing system.

16 Claims, 7 Drawing Sheets

OTHER PUBLICATIONS

Vadhiyar et al., "A Performance Oriented Migration Framework for the Grid," Proceedings of the 3$^{rd}$ IEEE/ACM International Symposium on Cluster Computing and the Grid (CCGRID'03), May 12-15, 2003, (8 pages).

Laszewski et al., "Grid-based Asynchronous Migration of Execution Context in Java Virtual Machines," Lecture Notes in Computer Science, Springer Verlag, New York, NY, vol. 1900, Sep. 2000 (12 pages).

Litzkow, et al., "Condor—A Hunter of Idle Workstations," International Conference on Distributed Computing Systems, San Jose, Jun. 13-17, 1988, Proceedings of the International Conference on Distributed Computing Systems, pp. 104-111.

* cited by examiner

CONTROL INTERFACES FOR DISTRIBUTED SYSTEM APPLICATIONS

BACKGROUND

This description relates to control interfaces for distributed system applications.

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can reduce cost of ownership, aggregate and improve efficiency of computing, data, and storage resources, and enable the creation of virtual organizations for applications and data sharing.

SUMMARY

The techniques described in this specification provide methods and apparatus, including computer program products, for control interfaces for distributed system applications.

In an aspect, a method includes, at an application deployed on a first computing system in a grid computing environment, monitoring a communication channel connecting the first computing system to a second computing system, receiving a command over the communication channel from the second computing system, in response to the received command, and generating a descriptor file including descriptions of one or more actions to be performed by the second computing system in order to move the application from the first computing system to a third computing system. and terminating execution of the application.

In embodiments, the method can include, at the first computing system, terminating execution of the application. The method can include at the second computing system, receiving the descriptor file including action descriptions, and using the action descriptions to move the application from the first computing system to the third computing system. The method can include, at the third computing system in the grid computing environment, starting execution of the application.

The descriptor file can be an extended markup language (XML) file. The action descriptions can include at least one of a set of command line parameters to be passed to the application at startup to initiate application execution at the third computing system, and a set of files associated with the application to be copied to the third computing system.

The application can be a mobile agent and the first descriptor file can include an empty list. The first computing system can be a first computational resource, the second computing system can be a grid resource manager, and the third computing system can be a second computational resource.

In another aspect, a method includes, at an application deployed on a first computing system in a grid computing environment, monitoring a communication channel connecting the first computing system to a second computing system, receiving a command over the communication channel from the second computing system, and in response to the received command, generating a descriptor file including descriptions of one or more actions to be performed by the second computing system in order to start the application.

In embodiments, the method can include, at the first computing system, terminating execution of the application. The method can include at the second computing system, receiving the descriptor file including action descriptions, and using the action descriptions to start the application at the first computing system.

The descriptor file can be an extended markup language (XML) file. The action descriptions can include at least one of a set of command line parameters to be passed to the application at startup to initiate application execution, and a set of log files.

The first computing system can be a computational resource and the second computing system can be a grid resource manager.

The details of one or more examples are set forth in the accompanying drawings and the description below. Other features, objects, and advantages of the invention will be apparent from the description and drawings, and from the claims.

DESCRIPTION OF DRAWINGS

FIGS. 4a and 4b are flow diagrams.
Like reference symbols in the various drawings indicate like elements.

DETAILED DESCRIPTION

Figure 1:
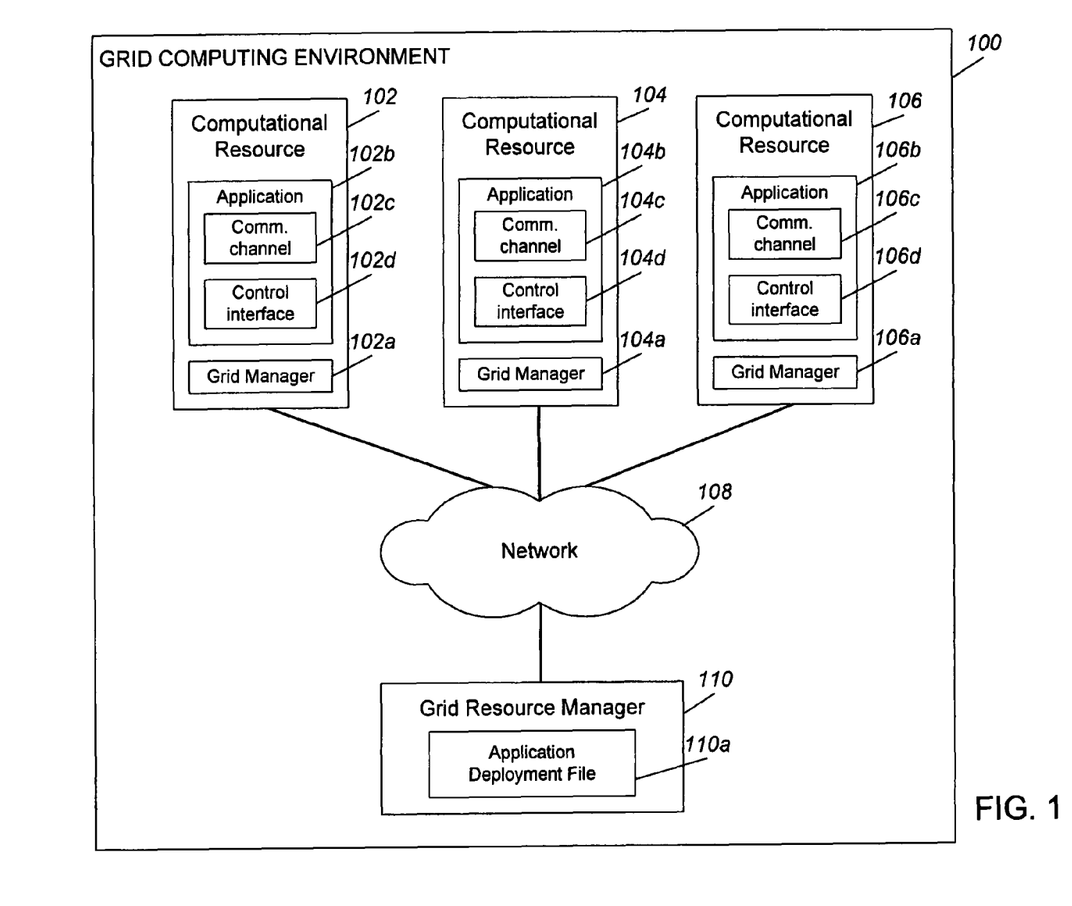
FIG. 1 is block diagram.

As shown in FIG. 1, a grid computing environment 100 includes a set of computational resources 102, 104, 106. The computational resources 102, 104, 106 communicate with each other through a network 108. The network 108 can be a local area network (LAN) or a larger group of interconnected systems, such as the Internet.

Each computational resource 102, 104, 106 is associated with a grid manager 102a, 104a, 106a. The grid managers 102a, 104a, 106a handle numerous functions, such as, for example, facilitating installation and de-installation of applications 102b, 104b, 106b on the computational resources 102, 104, 106. Allocating and de-allocating computational resources 102, 104, 106 allows the computational resources 102, 104, 106 in the grid computing environment 100 to be designated as general-purpose computational resources that may be used by a number of applications on an "as needed" basis, rather than solely dedicated to a single application all of the time.

Each grid manager 102a, 104a, 106a monitors resource utilization on its associated computational resource 102, 104, 106 and sends this utilization information to a grid resource manager 110 in response to a resource utilization query. In one example, the grid resource manager 110 sends a resource utilization query to one or more grid managers 102a, 104a, 106a prior to deploying an application in the grid computing environment 100. Responses to the resource utilization query are used by the grid resource manager 110 to determine if there are computational resources 102, 104, 106 in the grid computing environment 100 that match the computational resource requirements of the application ("application requirements") to be deployed. These computational resource requirements specify information pertaining to a computational resource 102, 104, 106, such as required number of processors, required percentage of utilization for those processors, main memory, operating system and network speed.

The grid resource manager 110 receives the utilization information from the grid managers 102a, 104a, 106a and compares the received utilization information with the application requirements to identify the computational resources that satisfy the application requirements. The grid resource manager 110 selects, from among the identified computational resources, at least one computational resource 102, 104, 106 and sends a reservation request to the grid manager 102a, 104a, 106a associated with the selected computational resource 102, 104, 106.

If the selected computational resource 102, 104, 106 is available for application deployment and the reservation succeeds, the grid manager 102a, 104a, 106a associated with the selected computational resource 102, 104, 106 sends a reservation number to the grid resource manager 110. This reservation number indicates to the grid resource manager 110 that the selected computational resource 102, 104, 106 has been guaranteed to the application to be deployed. The grid resource manager 110 deploys the application 102b, 104b, 106b by instructing the grid manager 102a, 104a, 106a associated with the selected computational resource 102, 104, 106 to install and run the application on the selected computational resource 102, 104, 106.

Once deployed, an entry including an application identifier and a computational resource identifier is added to an application deployment file 110a maintained by the grid resource manager 110. The application identifier uniquely identifies the deployed application; the computational resource identifier uniquely identifies the computational resource 102, 104, 106 on which the application is deployed. Other information may be included in an entry of the application deployment file 110a, for example, a high or low priority designation, a runtime of the application, and the application requirements.

Upon deployment, each application 102b, 104b, 106b opens and listens to a communication channel 102c, 104c, 106c during execution. In one implementation, an application listens for commands at a specific TCP/IP port that is specified at startup. In another implementation, an application exposes a Web service during execution through which the grid resource manager 110 issues commands to the application.

Each application 102b, 104b, 106b that is deployed in the grid computing environment 100 can be implemented with a control interface 102d, 104d, 106d that enables the grid resource manager 110 to control and manage the operation of the application 102b, 104b, 106b upon request. The interface defines a set of commands, such as "suspend", "continue", "stop_persistent", and "move". The operations associated with each of these commands will be described in more detail in examples to follow.

Figure 2A:
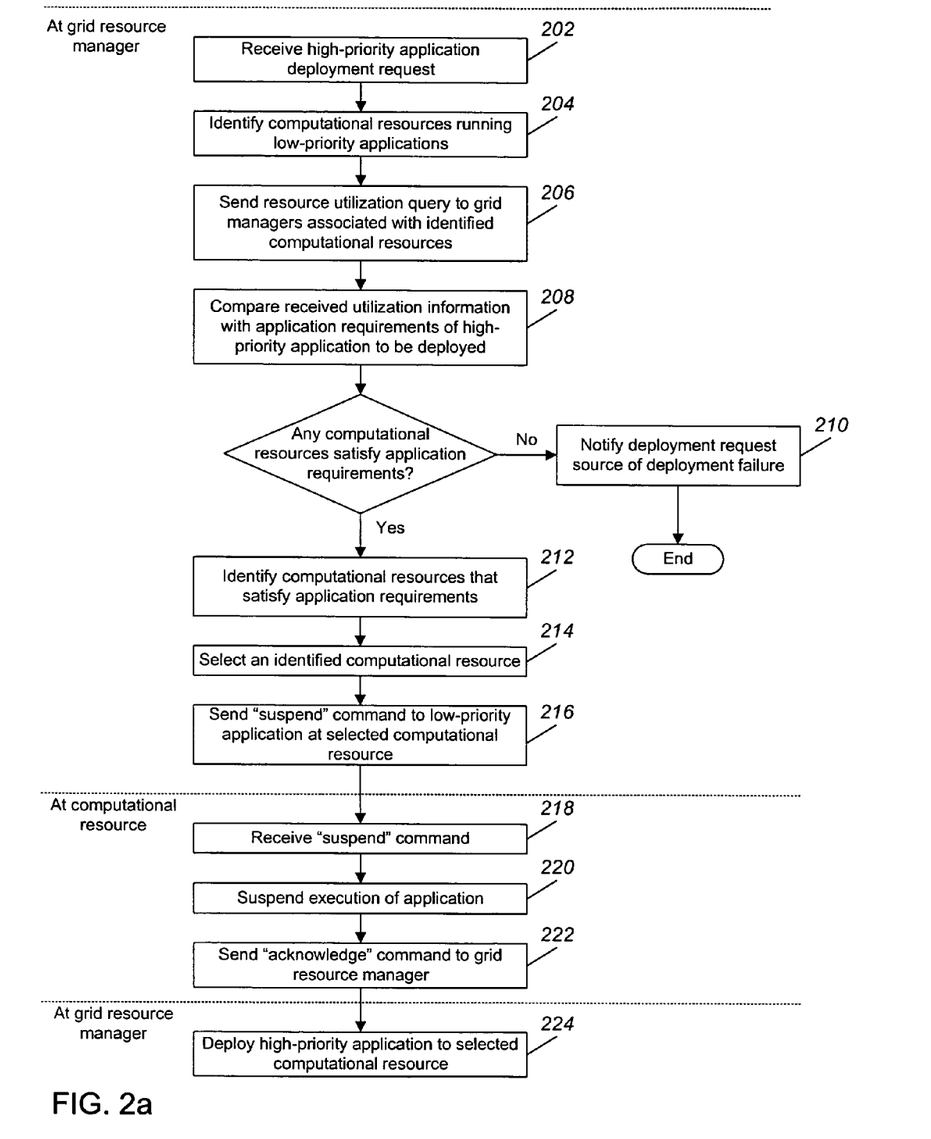
FIGS. 2a and 2b are flow diagrams.
Figure 2B:
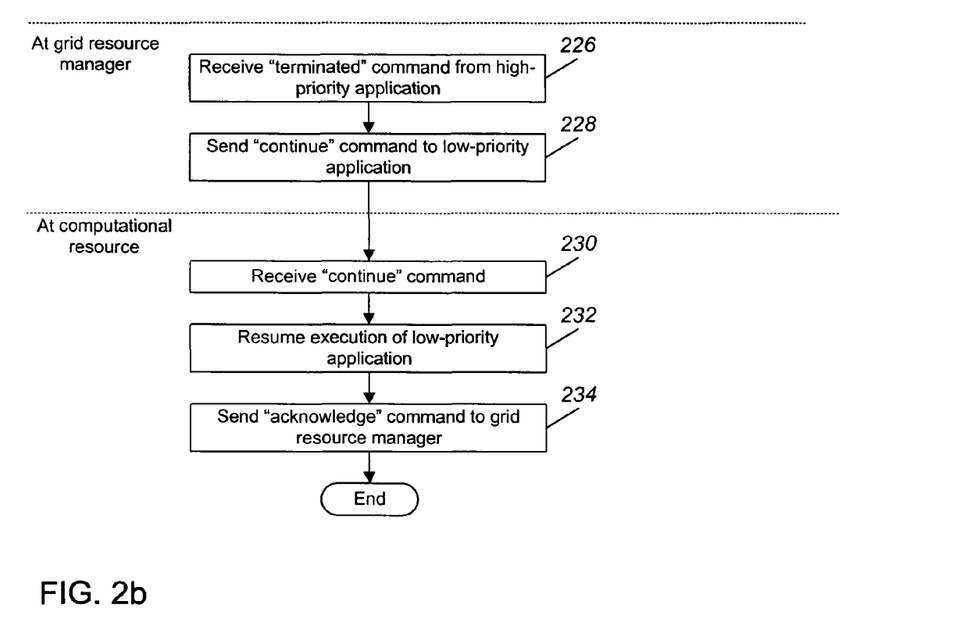

As shown in FIGS. 2a and 2b, in one example, all of the computational resources 102, 104, 106 in the grid computing environment 100 are busy running applications when the grid resource manager 110 receives (202) a request, e.g., from a user, to deploy an application having a high priority designation, also referred to as a high-priority application. Rather than wait for a computational resource 102, 104, 106 to become available, the grid resource manager 110 may be requested or instructed to suspend the execution of an application having a low priority designation, also referred to as a low-priority application, so that the high-priority application may be deployed and run on that computational resource 102, 104, 106.

In one implementation, the grid resource manager 110 examines the application deployment file 110a to identify (204) the computational resources 102, 104, 106 that are currently running low-priority applications. The grid resource manager 110 then sends (206) a resource utilization query to the grid managers 102a, 104a, 106a associated with the identified computational resources 102, 104, 106 as previously-described. The grid resource manager 110 compares (208) the received utilization information (e.g., responses to the query) with the application requirements of the high-priority application.

If none of the computational resources 102, 104, 106 are identified as satisfying the application requirements, a "deployment failure" alert may be generated by the grid resource manager and sent (210) to the application deployment request source, e.g., the user. The grid resource manager may provide a manual override feature that enables the application deployment request source to designate a computational resource to which the high-priority application is to be deployed regardless of the priority designation of the application that is currently being executed on that computational resource.

If at least one computational resource is identified (212) as satisfying the application requirements, the grid resource manager selects (214) one of the low-priority applications from among the low-priority applications deployed on the identified computational resources 102, 104, 106. In one implementation, the low-priority application ("selected low-priority application") having the longest runtime is selected by the grid resource manager 110. The grid resource manager 110 sends (216) a "suspend" command to the selected low-priority application over its corresponding communication channel.

Upon receipt (218) of the "suspend" command, the selected low-priority application suspends (220) execution at the computational resource and sends (222) an "acknowledge" command to the grid resource manager to indicate that the selected low-priority application has been placed in a "suspend" state. In the "suspend" state, the selected low-priority application consumes, for example, main memory, disk space, network connections of the computational resource, but not its processing power.

While the low-priority application is in the "suspend" state, the grid resource manager deploys (224) the high-priority application as previously-described. The deployed high-priority application may be implemented to send a "terminated" command to the grid resource manager to signal the completion of the execution of the high-priority application.

Upon receipt (226) of the "terminated" command, the grid resource manager sends (228) a "continue" command to the suspended low-priority application over the communication channel. The suspended low-priority application receives (230) the "continue" command and resumes (232) execution at the computational resource and sends (234) an "acknowledge" command to the grid resource manager to indicate that the application has been removed from the "suspend" state and placed in a "normal" state. In the "normal" state, the low-priority application resumes consumption of processing power.

Figure 3A:
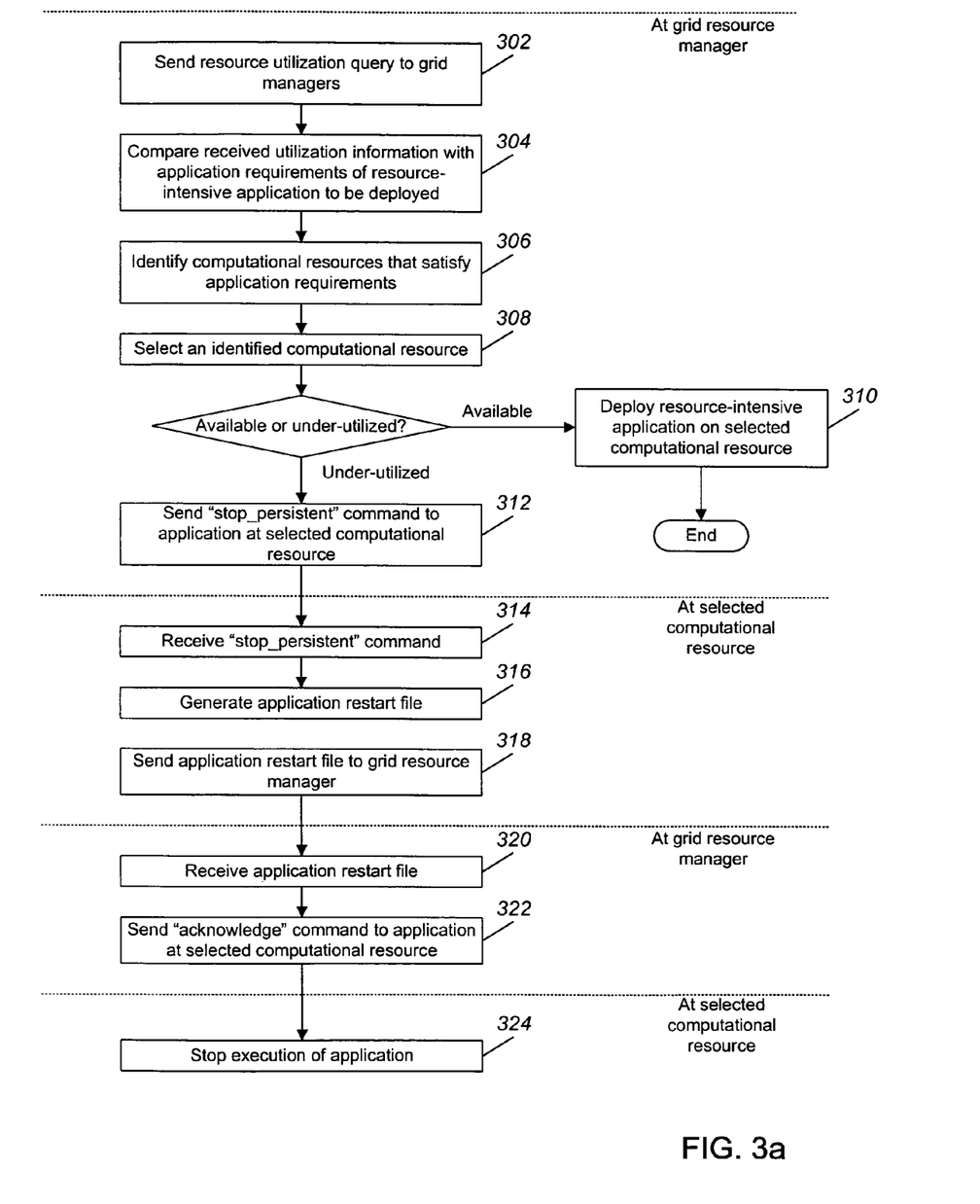
FIGS. 3a and 3b are flow diagrams.
Figure 3B:
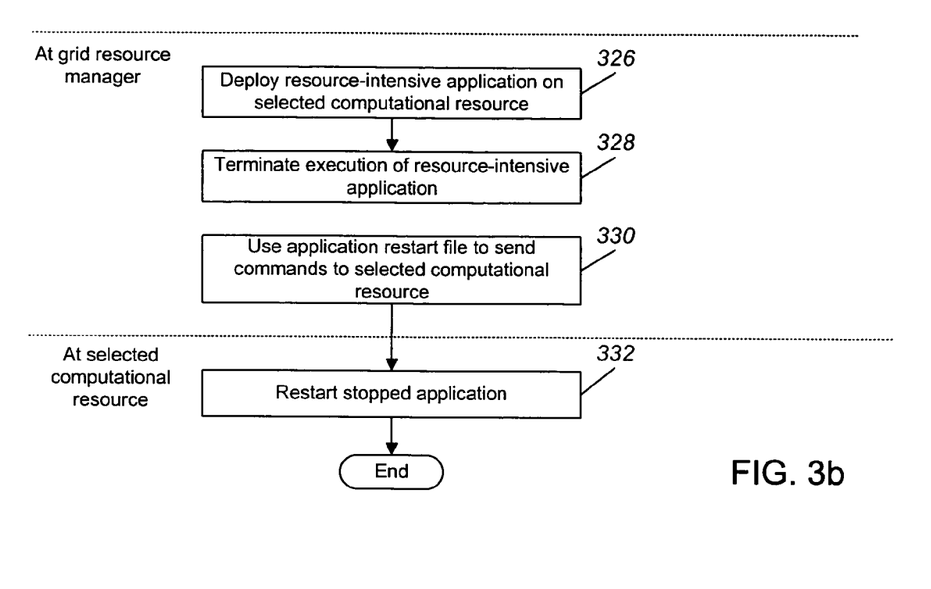

As shown in FIG. 3, in another example, multiple applications are deployed in the grid computing environment 100. One such application is a resource-intensive application (e.g., an application for running large-scale numerical simulations) that may be run concurrently on multiple computational resources 102, 104, 106 to reduce overall runtime.

In one implementation, the grid resource manager periodically sends (302) a resource utilization query to the grid managers 102a, 104a, 106a in the grid computing environment 100 to determine which computational resources 102, 104, 106 are available (i.e., no applications are deployed on the computational resource) or under-utilized (i.e., the resources consumed by an application running on the computational resource are less than a predetermined threshold). The grid resource manager compares (304) the received utilization information with the application requirements of the resource-intensive application and identifies (306) the computational resources 102, 104, 106 that satisfy the application requirements. The grid resource manager then selects (308) one or more of the identified computational resources 102, 104, 106 for allocation to the resource-intensive application.

If a selected computational resource 102, 104, 106 is available, the grid resource manager deploys (310) the resource-intensive application as previously-described.

If a selected computational resource 102, 104, 106 is under-utilized, the grid resource manager sends (312) a "stop_persistent" command to the application X over its corresponding communication channel. Upon receipt (314) of the "stop_persistent" command, the application X generates (316) an application restart file, such as an eXtended Markup Language (XML) file, that describes the information that the grid resource manager will use to restart the application X at a later time. The information in the application restart file can include, for example, one or more command line parameters that have to be passed to the application X at startup in order to initiate application execution at the selected computational resource 102, 104, 106, and copies of the log files. Log files are generated by the application itself. A task is to copy these files to a destination node in order to have continuous log files.

The application restart file is sent (318) to the grid resource manager. Upon receipt (320) of the application restart file, the grid resource manager sends (322) an "acknowledge" command to the application X that results in the termination (324) of the application X at the selected computational resource 102, 104, 106, and the placement of the application X in a "stop_persistent" state in which the application X only consumes disk space. The disk space may be local to the selected computational resources 102, 104, 106 or located on a remote computational resource 102, 104, 106 accessible via the network.

The grid resource manager may then deploy (326) the resource-intensive application to the selected computational resource 102, 104, 106 as previously-described. In one example, after a specific period of time has elapsed, the grid resource manager may terminate (328) the resource-intensive application and use (330) the application restart file to restart (332) the stopped application X at the selected computational resource 102, 104, 106, e.g., by passing the command line parameters specified in the application restart file to the stopped application X.

Figure 4A:
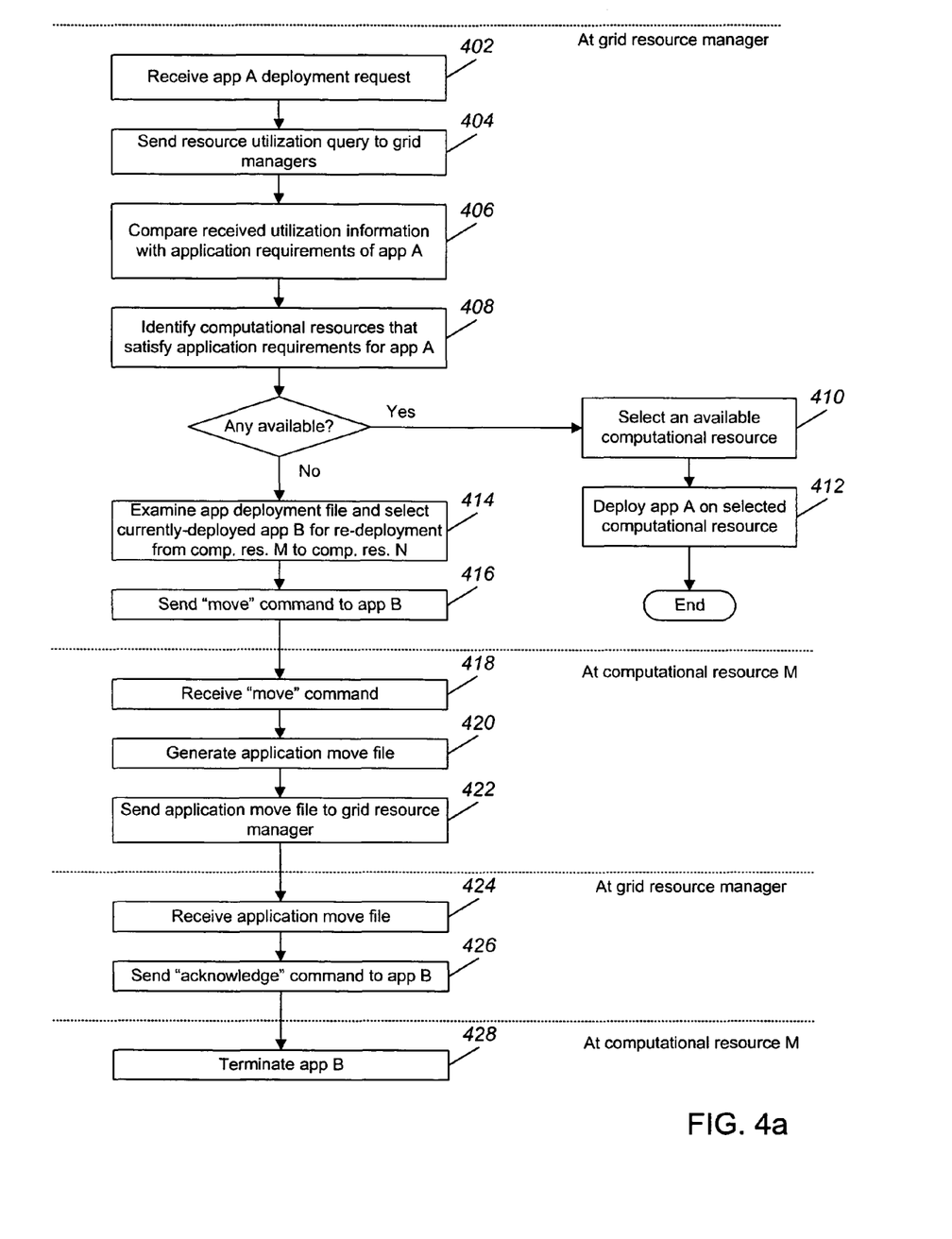
Figure 4B:
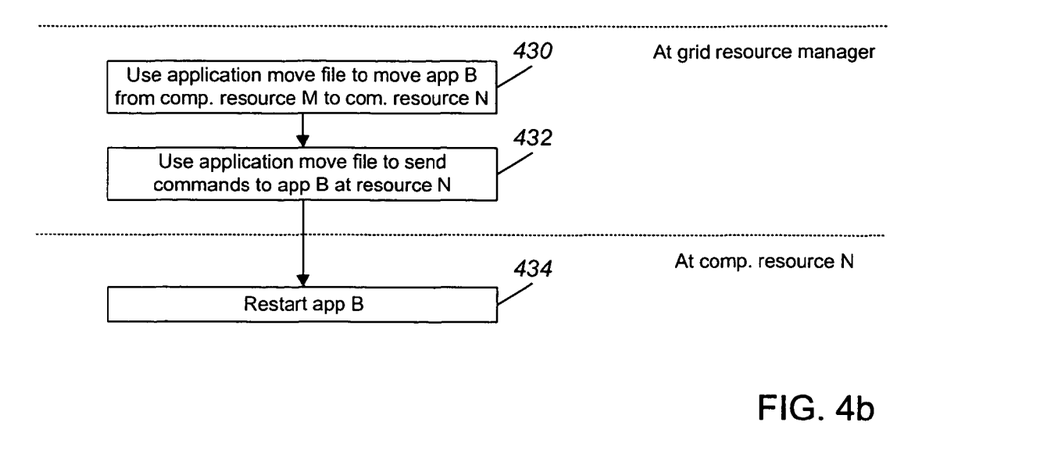

In another example, a number of applications are deployed on computational resources 102, 104, 106 in the grid computing environment 100 when the grid resource manager receives (402) a request, e.g., from a user, to deploy an application (e.g., "application A"). The grid resource manager sends (404) a resource utilization query to all of the grid managers 102a, 104a, 106a in the grid computing environment 100 as previously-described. The grid resource manager compares (406) the received utilization information with the application requirements of the application A and identifies (408) the computational resources 102, 104, 106 that satisfy the application requirements.

If at least one of the identified computational resources 102, 104, 106 is available for application deployment, the grid resource manager selects (410) one of the available computational resources 102, 104, 106 and deploys (412) the application A as previously-described.

If none of the identified computational resources 102, 104, 106 are available, the grid resource manager examines (414) the application deployment file 110a and selects, from among the applications deployed on the identified computational resources 102, 104, 106, an application (e.g., "application B") that may be deployed on a computational resource 102, 104, 106 ("computational resource N) different from the one ("computational resource M") on which it is currently-deployed. Factors that contribute to the selection of the application B include the uniqueness of the application requirements of the application B, and the priority designation and/or runtime of the application B.

The grid resource manager sends (416) a "move" command to the application B over its corresponding communication channel. Upon receipt (418) of the "move" command, the application B generates (420) an application move file, such as a XML file, that describes the information that the grid resource manager will use to move the application B from the computational resource M to the computational resource N. The information in the application move file can include, for example, a list of files that have to be copied to a certain location (e.g., the computational resource N or a database) and one or more command line parameters that have to be passed to the application B at startup in order to initiate application execution at the computational resource N.

If the application B is a mobile agent (i.e., an application that can transfer itself from one computational resource to another), then the generated application move file may be an empty list that is used to signal the grid resource manager that the application B received the "move" command.

The generated application move file is sent (422) to the grid resource manager. Upon receipt (424) of the application move file, the grid resource manager sends (426) an "acknowledge" command to the application B that results in the termination (428) of application B at the computational resource M. The grid resource manager 110 then uses (430) the application move file to move the application B from the computational resource M to the computational resource N. Once the application B is successfully moved, the grid resource manager 110 uses (432) the application move file to restart (434) the application B at the computational resource N, e.g., by passing the command line parameters specified in the application move file to the application B. The grid resource manager also deploys the application A to the currently-available computational resource M as previously described.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method implemented by a first computing system in a grid computing environment, the method comprising:
monitoring, by the first computing system, a communication channel connecting the first computing system with a second computing system comprising a grid resource manager;
receiving, by the first computing system, a resource utilization query from the grid resource manager, the resource utilization query requesting data reflecting availability of computational resources on the first computing system;
sending, by the first computing system, the data reflecting the availability of the computational resources on the first computing system to the grid resource manager in response to the resource utilization query;
receiving, by the first computing system, a first command over the communication channel from the grid resource manager to move a first application executing on the first computing system to a third computing system;
in response to the received command, generating, by the first computing system, a descriptor file including descriptions of one or more actions to be performed by the grid resource manager in order to move the first application from the first computing system to the third computing system, the descriptions of the actions including at least one of:
a set of command line parameters to be passed to the first application at startup to initiate execution of the first application at the third computing system, or
a set of files associated with the first application to be copied to the third computing system; and
receiving, by the first computing system, a second command over the communication channel from the grid resource manager to execute a second application on the first computing system,
wherein the first computing system is instructed to move the first application to the third computing system based on a determination that the first computing system has insufficient resources to execute both the first application and the second application, the determination being made by the grid resource manager based on the data reflecting the availability of the computational resources on the first computing system sent to the grid resource manager in response to the resource utilization query.

2. The method of claim 1, further comprising:
terminating execution of the first application by the first computing system.

3. The method of claim 1, further comprising:
at the second computing system,
receiving the descriptor file including the descriptions of the actions; and
using the action descriptions to move the first application from the first computing system to the third computing system.

4. The method of claim 3, further comprising:
at the third computing system, starting execution of the first application.

5. The method of claim 1, wherein the descriptor file is an extended markup language (XML) file.

6. The method of claim 1, wherein the descriptions of the actions include both:
the set of command line parameters to be passed to the first application at startup to initiate application execution at the third computing system; and
the set of files associated with the first application to be copied to the third computing system.

7. The method of claim 1, wherein the first application is a mobile agent and the first descriptor file includes an empty list.

8. The method of claim 1, wherein:
the first computing system is a first computational resource; and
the third computing system is a second computational resource.

9. A computer program product, tangibly embodied in a machine-readable storage device, the computer program product being operable to cause a first computing system to:
monitor, by the first computing system, a communication channel connecting the first computing system to a second computing system comprising a grid resource manager;
receive, by the first computing system, a resource utilization query from the grid resource manager, the resource utilization query requesting data reflecting availability of computational resources on the first computing system;
send, by the first computing system, the data reflecting the availability of the computational resources on the first computing system to the grid resource manager in
response to the resource utilization query;
receive, by the first computing system, a first command
over the communication channel from the grid resource
manager to move a first application executing on the first
computing system to a third computing system;
in response to the received command, generate, by the first
computing system, a descriptor file including descriptions of one or more actions to be performed by the grid
resource manager in order to move the first application
from the first computing system to the third computing
system, the descriptions of the actions including at least
one of:
a set of command line parameters to be passed to the first
application at startup to initiate execution of the first
application at the third computing system, or
a set of files associated with the first application to be
copied to the third computing system; and
receive, by the first computing system, a second command
over the communication channel from the grid resource
manager to execute a second application on the first
computing system,
wherein the first computing system is instructed to move
the first application to the third computing system based
on a determination that the first computing system has
insufficient resources to execute both the first application and the second application, the determination being
made by the grid resource manager, based on the data
reflecting the availability of the computational resources
on the first computing system sent to the grid resource
manager, in response to the resource utilization query.

10. The computer program product of claim 9, further
operable to:
terminate execution of the first application.

11. The computer program product of claim 9, further
operable to:
at the second computing system, receive the descriptor file
including the descriptions of the actions; and
use the action descriptions to move the first application
from the first computing system to the third computing
system.

12. The computer program product of claim 11, further
operable to at the third computing system in the grid computing environment, start execution of the first application.

13. The computer program product of claim 9, wherein the
descriptor file is an extended markup language (XML) file.

14. The computer program product of claim 9, wherein the
descriptions of the actions include both:
the set of command line parameters to be passed to the first
application at startup to initiate application execution at
the third computing system; and
the set of files associated with the first application to be
copied to the third computing system.

15. The computer program product of claim 9, wherein the
first application is a mobile agent and the first descriptor file
includes an empty list.

16. A first computing system comprising:
a machine-readable storage device including instructions
for causing the first computing system to:
monitor a communication channel connecting the first
computing system to a second computing system
comprising a grid resource manager;
receive a resource utilization query from the grid
resource manager, the resource utilization query
requesting data reflecting availability of computational resources on the first computing system;
send the data reflecting the availability of the computational resources on the first computing system to the
grid resource manager in response to the resource
utilization query;
receive a first command over the communication channel from the grid resource manager to move a first
application executing on the first computing system to
a third computing system;
in response to the received command, generate a
descriptor file including descriptions of one or more
actions to be performed by the grid resource manager
in order to move the first application from the first
computing system to the third computing system, the
descriptions of the actions including at least one of:
a set of command line parameters to be passed to the
first application at startup to initiate execution of
the first application at the third computing system,
or
a set of files associated with the first application to be
copied to the third computing system; and
receive a second command over the communication
channel from the grid resource manager to execute a
second application on the first computing system; and
a processor configured to execute the instructions,
wherein the first computing system is instructed to move
the first application to the third computing system based
on a determination that the first computing system has
insufficient resources to execute both the first application and the second application, the determination being
made by the grid resource manager based on the data
reflecting the availability of the computational resources
on the first computing system sent to the grid resource
manager in response to the resource utilization query.

* * * * *